(12) United States Patent
Sawada et al.

(10) Patent No.: US 7,799,259 B2
(45) Date of Patent: Sep. 21, 2010

(54) TWO-COLOR MOLDING METHOD

(75) Inventors: Hisashi Sawada, Okazaki (JP); Shuichi Tamaki, Nishio (JP); Yukinori Narita, Toyokawa (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 12/316,246

(22) Filed: Dec. 10, 2008

(65) Prior Publication Data
US 2009/0174113 A1  Jul. 9, 2009

(30) Foreign Application Priority Data
Dec. 11, 2007  (JP) ............... 2007-319975

(51) Int. Cl.
- *B29B 7/00* (2006.01)
- *B29C 45/00* (2006.01)
- *B28B 7/22* (2006.01)
- *A23G 1/22* (2006.01)
- *A23P 1/00* (2006.01)
- *B29B 11/06* (2006.01)

(52) U.S. Cl. .............. 264/328.7; 264/245; 264/255; 264/328.1; 264/328.8; 264/328.9; 264/328.13; 425/120; 425/572; 425/577; 425/588

(58) Field of Classification Search .............. 264/245, 264/328.1, 328.7, 328.8, 328.9, 328.13, 255
See application file for complete search history.

(56) References Cited

U.S. PATENT DOCUMENTS

| | | | | |
|---|---|---|---|---|
| 3,632,729 A | * | 1/1972 | Bielfeldt | .............. 264/294 |
| 4,726,758 A | * | 2/1988 | Sekine et al. | .............. 425/575 |
| 6,866,811 B2 | * | 3/2005 | Kayano et al. | .............. 264/513 |
| 2001/0050450 A1 | | 12/2001 | Kayano et al. | |

FOREIGN PATENT DOCUMENTS

| | | |
|---|---|---|
| JP | 61-029516 | 2/1986 |
| JP | 61-213118 | 9/1986 |
| JP | 62-116122 | 5/1987 |
| JP | 06-023785 | 2/1994 |
| JP | 11-048284 | 2/1999 |
| JP | 2004-262209 | 9/2004 |

OTHER PUBLICATIONS

Office Action dated Oct. 6, 2009 in corresponding Japanese Patent Application No. 2007-319975 with English translation.

* cited by examiner

*Primary Examiner*—Matthew J. Daniels
*Assistant Examiner*—Atul Khare
(74) *Attorney, Agent, or Firm*—Harness, Dickey & Pierce, PLC

(57) ABSTRACT

A two-color molding method with a short cycle time and a multicolor molding method including that two-color molding method, whereby, by performing an elastomer molding step using a time Z from a time t2 to t7 in the range of the time Y needed for the shaped article takeout step (A and B) and mold closing step (C) in the time t1 to t9, it becomes possible to effectively use the time of the shaped article takeout step (A and B) and mold closing step (C) which could not be utilized at all for the molding process in the past for the molding process, whereby the cycle molding time X can be shortened.

5 Claims, 12 Drawing Sheets

FIG.7
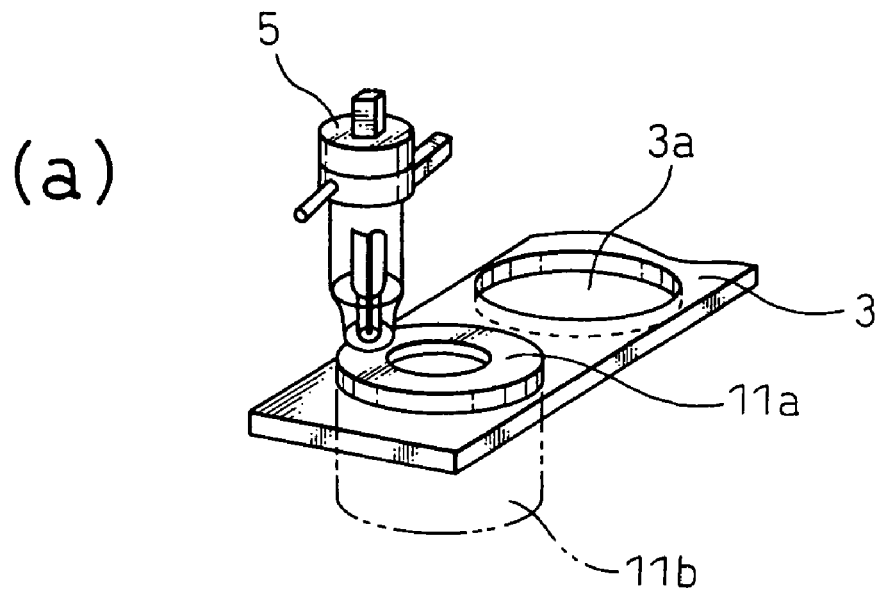
(a)
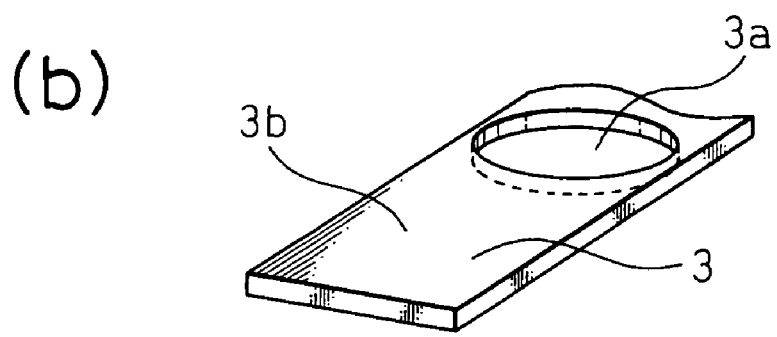
(b)
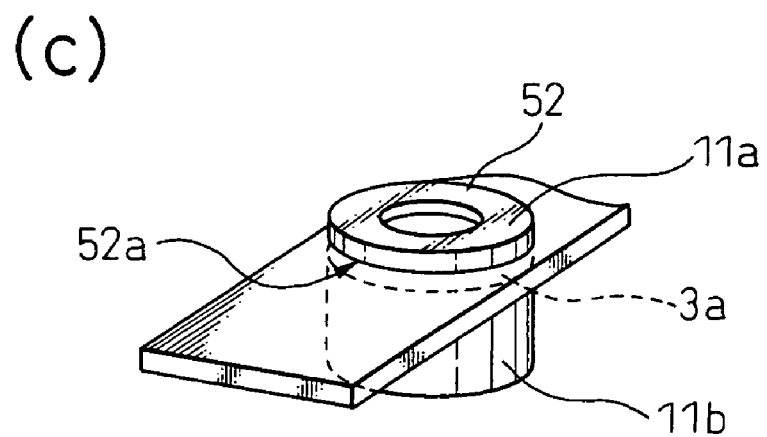
(c)

FIG.9
(a)
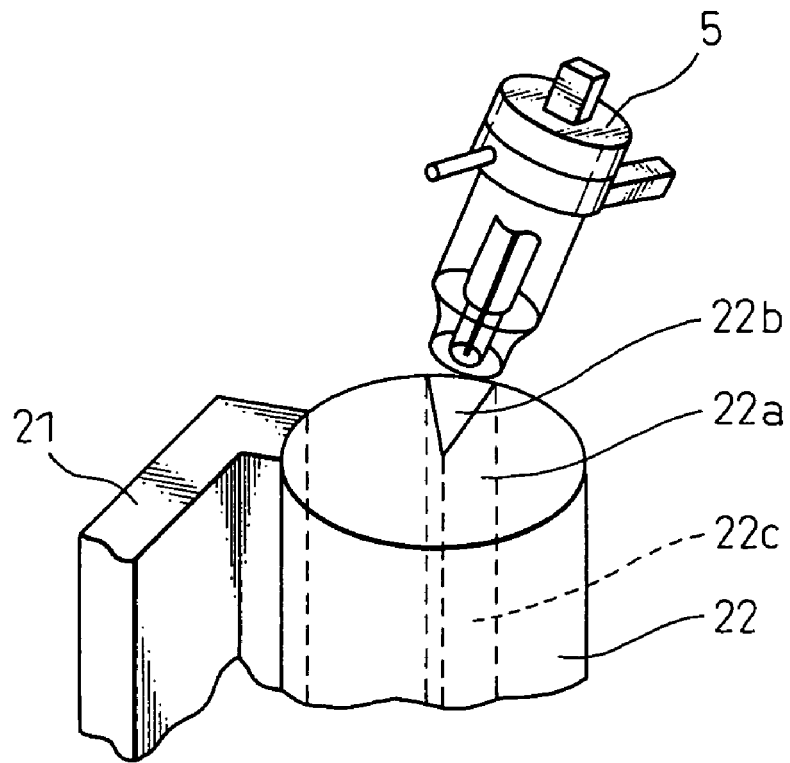
(b)
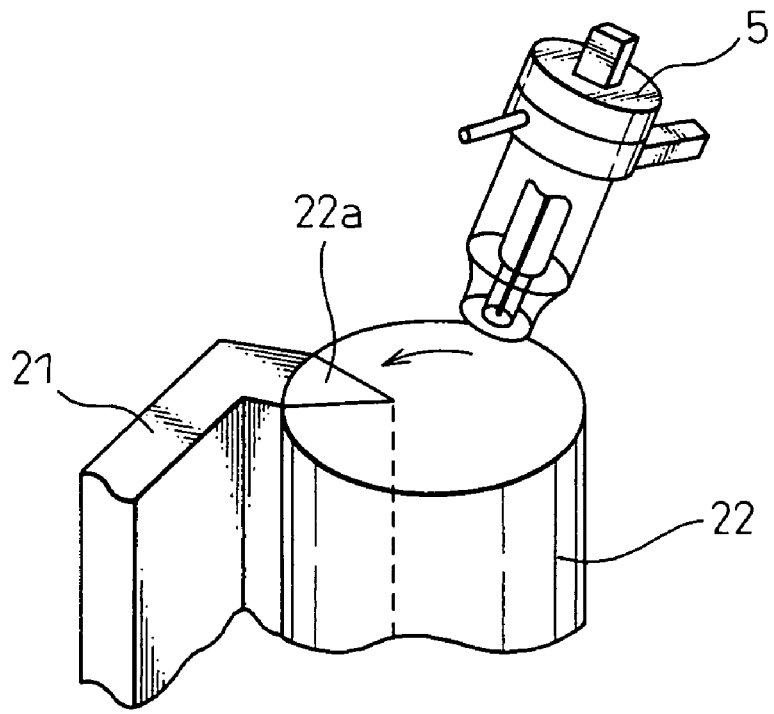

TWO-COLOR MOLDING METHOD

BACKGROUND OF THE PRESENT INVENTION

1. Field of the Invention

The present invention relates to a two-color molding method of thermoplastic resin by injection molding, more particularly relates to a two-color molding method for molding a shaped article comprised of a main part and packing part which molds the main part by a second thermoplastic resin and molds the packing part by a first thermoplastic resin.

2. Description of the Related Art

When it is necessary due to the demands for physical properties or design to mold one article from a plurality of types of resins or a plurality of the same type of resin having different colors, the two-color molding method has been employed in the past. This two-color molding method first injects a first molten resin into a first cavity to mold a first resin part, then injects a second molten resin into the second cavity adjacent to the first cavity to mold a second resin part. By doing so, the first resin part and the second resin part are melt bonded together to form an integrated two-color shaped article.

With this two-color molding method, it is necessary to partition the first cavity and the second cavity so as to limit the flow of the first molten resin to the second cavity. As this method, when using a plurality of different molds, there is the method of partitioning the molds themselves, but when using one type of mold, as described in Japanese Patent Publication (A) No. 11-48284, partitioning by a slide core (movable partitioning member) is often used.

On the other hand, one cycle of the shaped article production time for molding one or one set of two-color shaped articles is basically comprised of a step of closing the mold, a step of injecting a molten resin into the mold cavity, a step of cooling and solidifying the molten resin, a step of opening the mold, and a step of taking out the shaped article from the mold. However, when repeating the method of molding described in Japanese Patent Publication (A) No. 11-48284 to produce two-color shaped articles in large quantities, one cycle of the shaped article production time (hereinafter referred to as the "cycle time") becomes longer. This is mainly because when the mold is closed, the first resin and second resin are injected for molding, so the time when the mold is opened does not contribute at all to the molding of the resin.

SUMMARY OF THE INVENTION

The present invention was made in consideration of the above problems and has as its object the provision of a two-color molding method with a short cycle time and a multi-color molding method including the two-color molding method.

The present invention provides a two-color molding method of the following aspects as means for solving the above problem. According to a first aspect of the present invention, there is provided a two-color molding method simultaneously advancing a shaped article takeout step (A and B) and mold closing step (C), a closed first space forming step (F), a first resin infection step (G), and a first resin solidification step (H) and first and second space communication step (I); wherein the closed first space forming step (F) is started after the shaped article takeout step (A and B) is started and wherein the mold closing step (C) is ended after the first and second space communication step (I) is ended.

By performing the elastomer molding step Z in the range of the time Y needed for the shaped article takeout step (A and B) and the mold closing step (C), the time of the shaped article takeout step (A and B) and mold closing step (C) which was not actively used at all in the past can be used effectively for the molding step. By this, the molding time X of 1 cycle can be reduced.

According to a second aspect of the present invention, there is provided a two-color molding method wherein the movable partitioning member (22, 32) is provided with the first space (22a, 32a). Due to this, it becomes possible to produce various shapes of first resin molded parts.

According to a third aspect of the present invention, there is provided a two-color molding method wherein the first thermoplastic resin is a soft resin, the second thermoplastic resin is a hard resin, the two-color shaped article (50, 60, 70) is comprised of a main part (51, 61, 71a) and packing part (52, 62, 71b), the main part (51, 61, 71a) is formed from the second thermoplastic resin, and the packing part (52, 62, 71b) is formed from the first thermoplastic resin.

Conventionally, the main body was molded from a resin and assembled with a separately fabricated packing to form the finished product. By integrally molding the main body and the packing, the quality control costs, assembly costs, and maintenance and management costs can be reduced.

According to a fourth embodiment of the present invention, the multicolor molding method is characterized by including a two-color molding method of any of the first to third aspects. This clarifies that the two-color molding method of the present invention can also be used for a multicolor molding method. Note the numerals in parentheses after the means described in the claims and this section show the correspondence with specific means described in the later-mentioned embodiments.

BRIEF DESCRIPTION OF THE DRAWINGS

These and other objects and features of the present invention will become clearer from the following description of the preferred embodiments given with reference to the attached drawings, wherein:

FIG. 7 gives views for explaining movement of a cavity partitioning member of the first embodiment of the present invention;

FIG. 9 is a view showing movement of a first space member of the second embodiment of the present invention;

wherein 1 indicates a fixed side mold, 2 a movable side mold, 3 a movable cavity partitioning member, 4 an injection nozzle, 5 a compact injection molding unit, 6 a shaft, 11 a cavity, 22 a first space member of a second embodiment, 32 a first space member of the third embodiment, 50 a two-color shaped article of the first embodiment, 60 a two-color shaped article of the second embodiment, 70 a two-color shaped article of the third embodiment, and 100 a mold apparatus of the first embodiment.

DESCRIPTION OF THE PREFERRED EMBODIMENTS

Below, an embodiment of the present invention will be described based on the drawings. In the specification, the "movable partitioning member" means the member partitioning the space for molding two types of thermoplastic resins to a first space for molding a first thermoplastic resin and a second space for molding a second thermoplastic resin, while the "movable first space member" means the movable partitioning member provided itself with the first space into which the first thermoplastic resin is filled by injection. Further, in the specification, the "displacement" of the member means displacement of at least one position of the member surface in translational motion, rotational motion, and all other motion of the member.

First Embodiment

Figure 6:
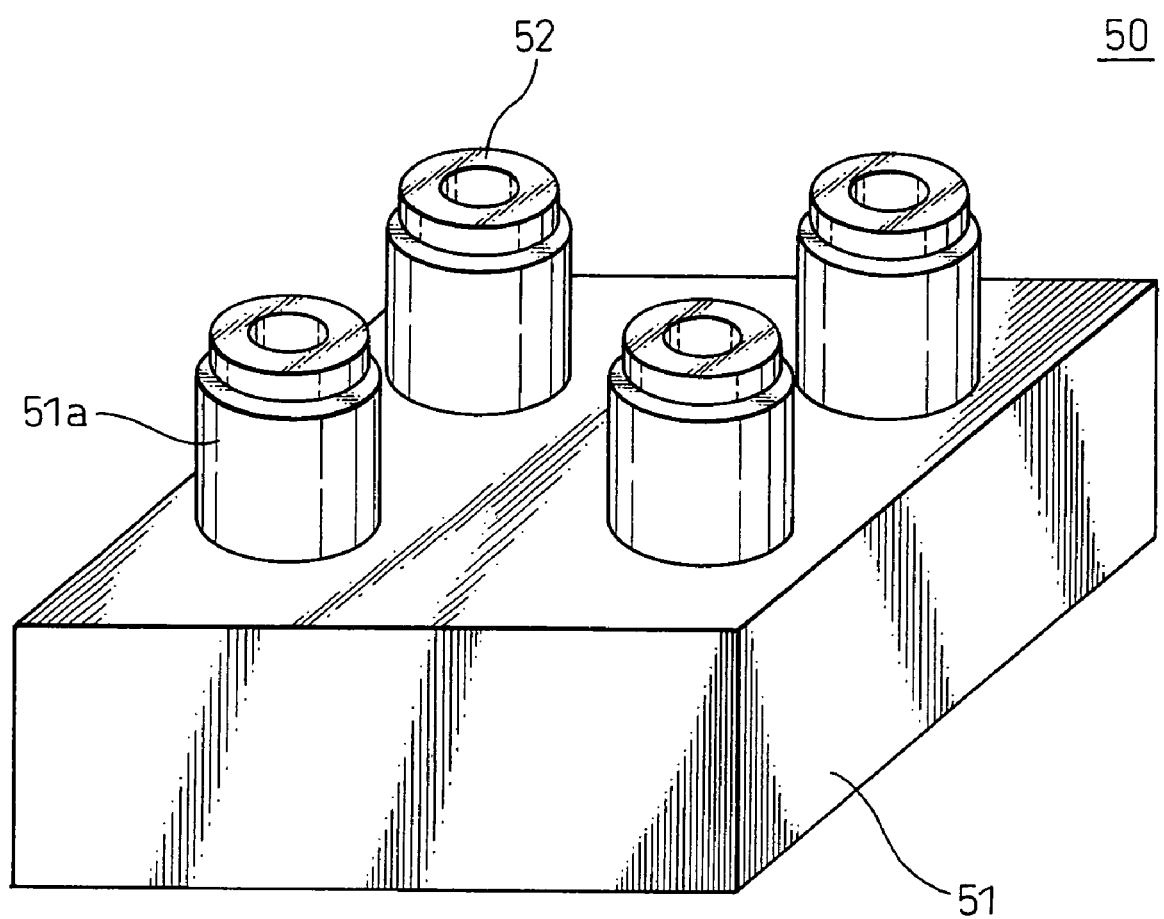
FIG. 6 is a view showing a two-color shaped article molded in the first embodiment of the present invention.

First, a first embodiment of the present invention will be explained. The first embodiment is a two-color molding method using a movable cavity partitioning member partitioning a cavity formed by a fixed side mold and movable side mold into a first space and second space (hereinafter, simply referred to as a "cavity partitioning member"). FIG. 6 is a schematic view showing a two-color shaped article 50 molded by the first embodiment. The two-color shaped article 50 is comprised of a main part 51 and packing part 52. The main part 51 has a rectangular shape having four boss parts 51a. At each cylindrical boss part 51a, a donut-shaped packing part or seal part (hereinafter simply referred to as a "packing part") 52 is melt bonded to be formed integral with it. The main part 51 (including the boss parts 51a) is made by a hard resin (second resin), for example, a general-use resin polypropylene, and the packing part 52 is made by a soft resin (first resin), for example, an elastomer.

Further, FIG. 6 shows a two-color shaped article from which a sprue 51x (see FIG. 2) molded by a resin passage is cut off. The two-color shaped article 50 may be, for example, a vehicular air-conditioner part or any other case, cover, or other product. Of course, the main part does not have to include the boss parts and may have a shape that is not rectangular but cylindrical or the shape of a spiral casing or the like. Further, the packing part is not limited to a donut shape and may be rectangular or any other shape.

Figure 2:
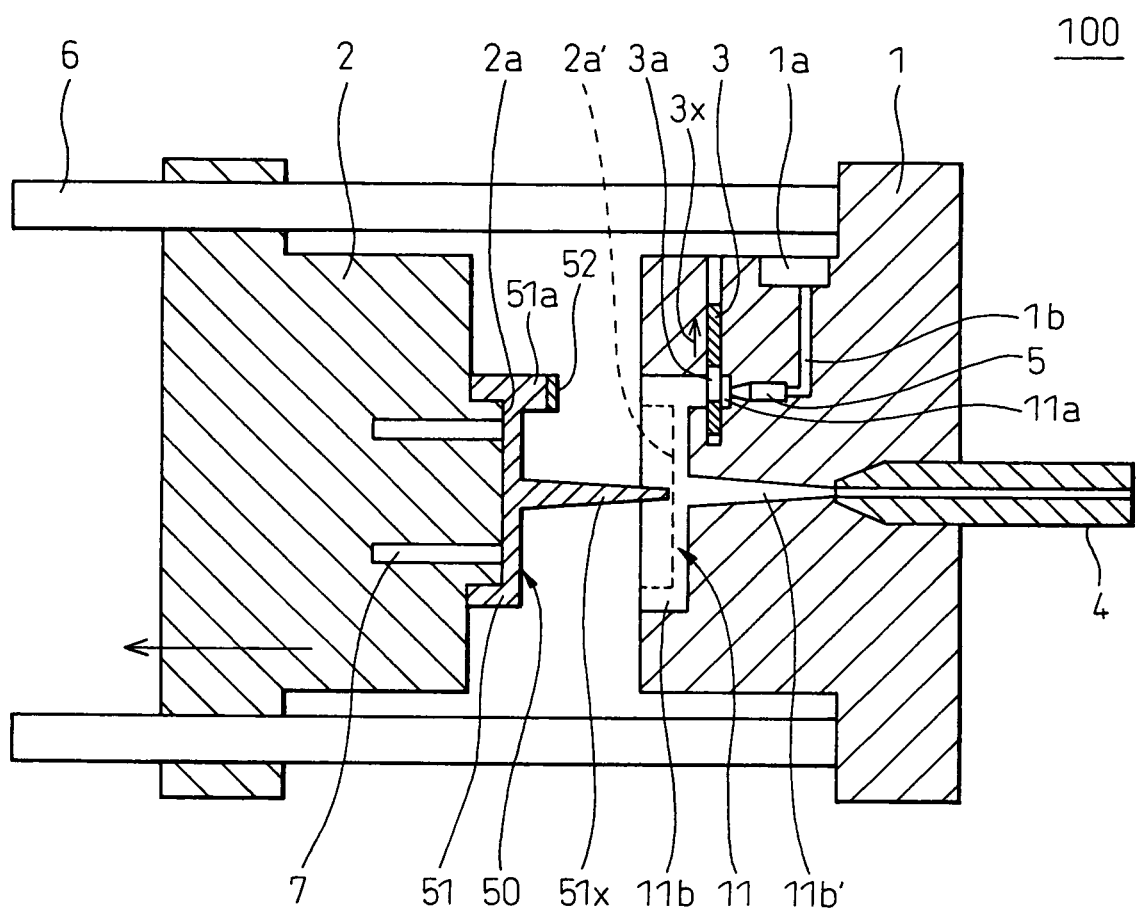
FIG. 2 is a view showing the state of the mold apparatus in a shaped article takeout step and a closed first space forming step of the first embodiment of the present invention.

Next, a mold apparatus 100 of the first embodiment will be described based on FIG. 2. FIG. 2 is a view showing the state of a mold apparatus 100 in a shaped article takeout step and a closed first space forming step of the first embodiment. The mold apparatus 100 has a fixed side mold 1, a movable side mold 2 freely openable and closable with respect to the fixed side mold 1, and a cavity partitioning member 3 arranged at the fixed side mold 1 and partitioning a cavity 11 formed by the fixed side mold 1 and the movable side mold 2 into a first space 11a and second space 11b. The cavity partitioning member 3 may be arranged at the movable side mold 2 as well. The fixed side mold 1 and movable side mold 2 are supported by a shaft 6 provided at a polypropylene injection molding machine that injection molds polypropylene (second resin). The fixed side mold 1 is fixed to the shaft 6, while the movable side mold 2 guides the shaft 6 to move in a straight line in a slidable fashion to open or close the mold.

The fixed side mold 1 has an injection nozzle 4 inserted into it at its center part. Polypropylene (second resin) is injected from the injection nozzle 4. Further, the fixed side mold 1 is provided with a compact injection molding unit 5, a hopper 1a holding an elastomer material, and a transport path 1b transporting the elastomer material from the hopper 1a to the compact injection molding unit 5. The compact injection molding unit 5 is an apparatus for injecting the elastomer (first resin) and has the functions of plasticizing, weighing, and feeding the elastomer. In FIG. 2, the compact injection molding unit 5 is built in the mold, but of course it may also be provided outside it.

Figure 4:
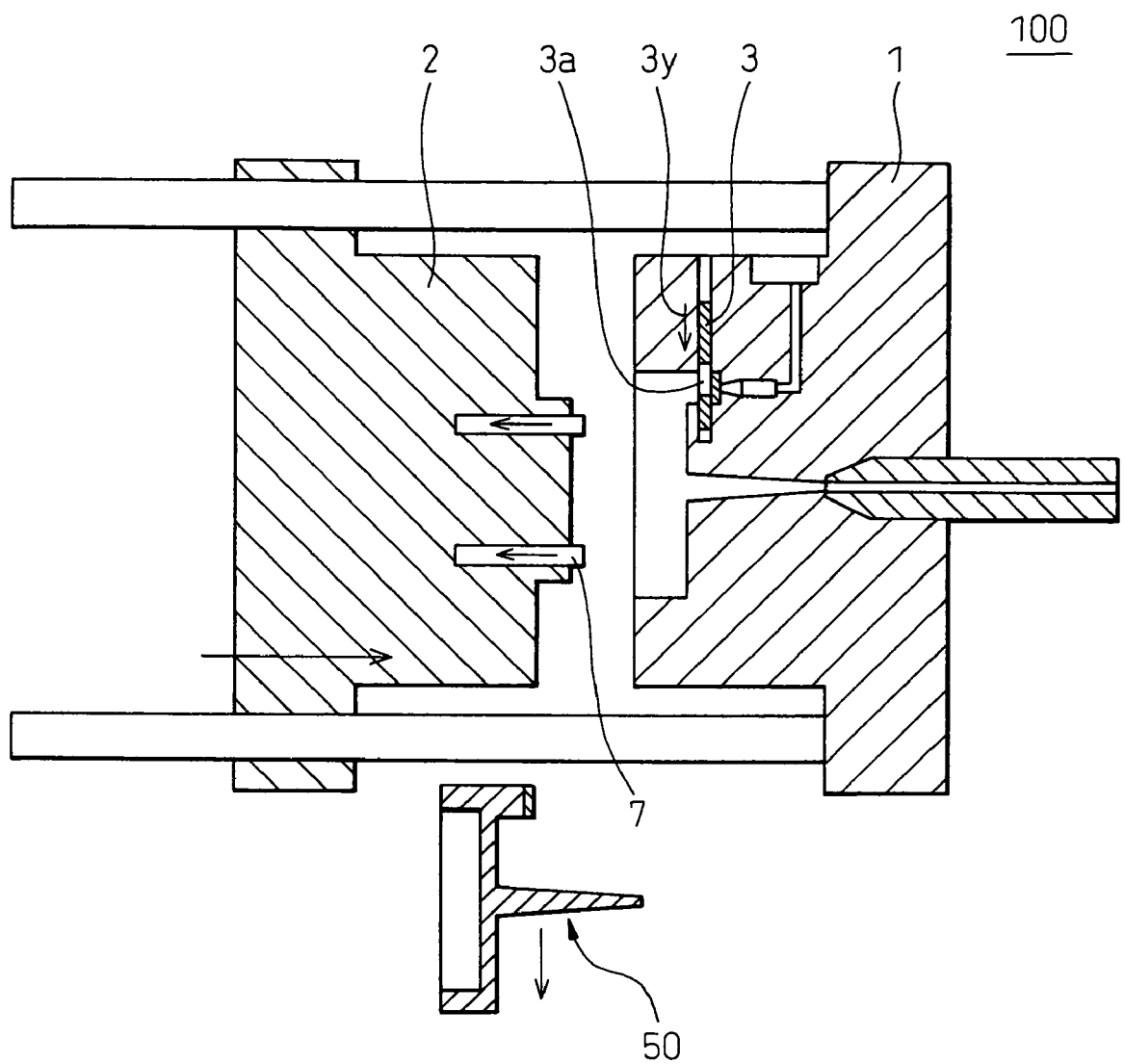
FIG. 4 is a view showing the state of the mold apparatus in a mold closing step and a first and second space communication step of the first embodiment of the present invention.

Between the fixed side mold 1 and the movable side mold 2 is formed a space for molding the resin, that is, a cavity 11. Note that the dotted line 2a' of FIG. 2 shows the surface 2a of the movable side mold 2 when the movable side mold 2 is clamped (the mold is closed) (see FIG. 5). The fixed side mold 1 is provided with the cavity partitioning member 3 (see FIG. 7) in a manner enabling it to freely advance and retract. The cavity partitioning member 3 retracts (arrow 3x of FIG. 2) to partition the cavity 11 into the first space 11a and the second space 11b. Further, it advances (arrow 3y of FIG. 4) to communicate and open the first space 11a and second space 11b partitioned by this through the hole 3a of the cavity partitioning member 3 to return to the original cavity 11 state. The first space 11a is a space filled by injection of the elastomer, while the second space 11b is a space filled by injection of polypropylene. The second space 11b includes a sprue 11b' of the molten resin passage. Note that the boundary between the first space 11a and second space 11b is shown by the dotted line 2a' in FIG. 2.

The movement of the cavity partitioning member 3 will be explained with reference to FIG. 7. FIG. 7 gives views showing the internal structure of the mold. FIG. 7(a) shows the relationship among the cavity partitioning member 3, the compact injection molding unit 5, and the mold cavity 11 when the cavity partitioning member 3 is in a retracted state. FIG. 7(b) shows only the cavity partitioning member 3. The cavity partitioning member 3 is provided with a hole 3a of the same diameter as the boss parts 51a of the shaped article 50. Due to the retracted state of the cavity partitioning member 3 shown in FIG. 7(a), the cavity 11 is partitioned into the first space 11a and second space 11b via the flat part (no hole) 3b of the cavity partitioning member 3. FIG. 7(c) is a view showing the relationship among the cavity partitioning member 3, the hole 3a of the cavity partitioning member 3, and the mold cavity 11 when the cavity partitioning member 3 is in the advanced state. The position of the compact injection molding unit 5 is the same as the position in FIG. 7(a). Due to the advanced state of the cavity partitioning member 3, the partitioned first space 11a and second space 11b are communicated and opened through the hole 3a and returned to the original cavity 11.

The movable side mold 2 has the shaped article 50 stuck to it immediately after being molded. In FIG. 2, for simplification, of the normally four packing parts 52 and boss parts 51a, only one each is shown. The rest are omitted. Further, in the shaped article 50, a sprue 51x molded in the resin passage 11b' is formed. This sprue 51x is not necessary in the final product, so is cut off and disposed of after being taken out from the mold. The movable side mold 2 is provided with a plurality of ejector pins 7 for detaching the shaped article 50 from the movable side mold 2.

Figure 1:
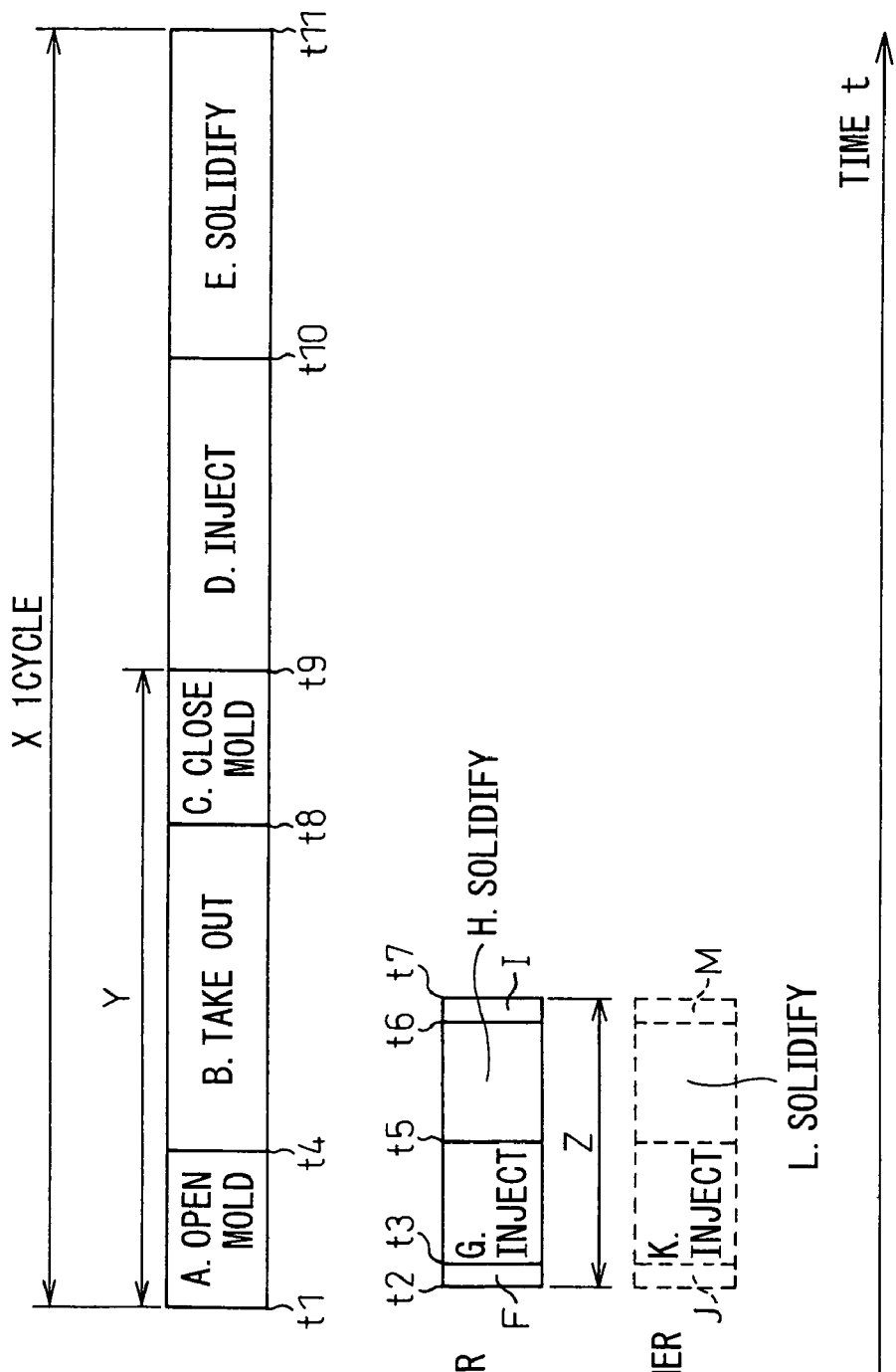
FIG. 1 is a view showing a process time chart of the two-color molding method of the present invention.

Next, based on FIG. 1, the process of the first embodiment will be described. FIG. 1 is a view showing process time charts of the present invention. (a) is a time chart showing a molding step of a polypropylene resin, (b) showing a molding step of the first elastomer, and (c) showing a molding step of the second elastomer in units of time on the horizontal axis. (a), (b), and (c) are each shown by the same time axis.

First, the steps of (a) and (b) will be explained. At the time t1, the movable side mold 2 begins to open from the state where it is clamped to the fixed side mold 1 (see FIG. 5). Due to the hydraulic pressure drive apparatus (not shown) of the injection molding machine, the movable side mold 2 is guided by the shaft 6 and moved to the left direction (see FIG. 2). The state where the movement of the movable side mold 2 is halted is shown in FIG. 2. At the time t2 where some time has passed since the movable side mold 2 began opening, the cavity partitioning member 3 begins moving upward (arrow 3x direction in FIG. 2). At the time t3, the cavity partitioning member 3 finishes its movement upward whereby the cavity 11 is partitioned into the first space 11a and the second space 11b, and the second space 11b is completely shut off from the first space 11a (see FIG. 3). The period from the time t2 to the time t3 becomes the closed first space forming steps F and J.

At the time t3, the cavity partitioning member 3 finishes its upward movement, whereby the compact injection molding unit 5 begins injection of the molten first elastomer. At the time t5, the first elastomer finishes being injected. The period from the time t3 to the time t5 becomes the first resin injection steps G and K. At the time t5, the molten first elastomer is cooled by the mold 1, and at time t6, solidification of the first elastomer is finished. The period from the time t5 to the time t6 becomes the first resin solidification steps H and L. At the time t6, the cavity partitioning member 3 begins to move downward (the arrow 3y direction in FIG. 4). At the time t7, the cavity partitioning member 3 finishes moving downward, whereby the partitioned first space 11a and second space 11b form the cavity 11 by communicating through the hole 3a of the cavity partitioning member 3 (see FIG. 5). The period from the time t6 to the time t7 becomes the first and second space communication steps I and M.

Figure 3:
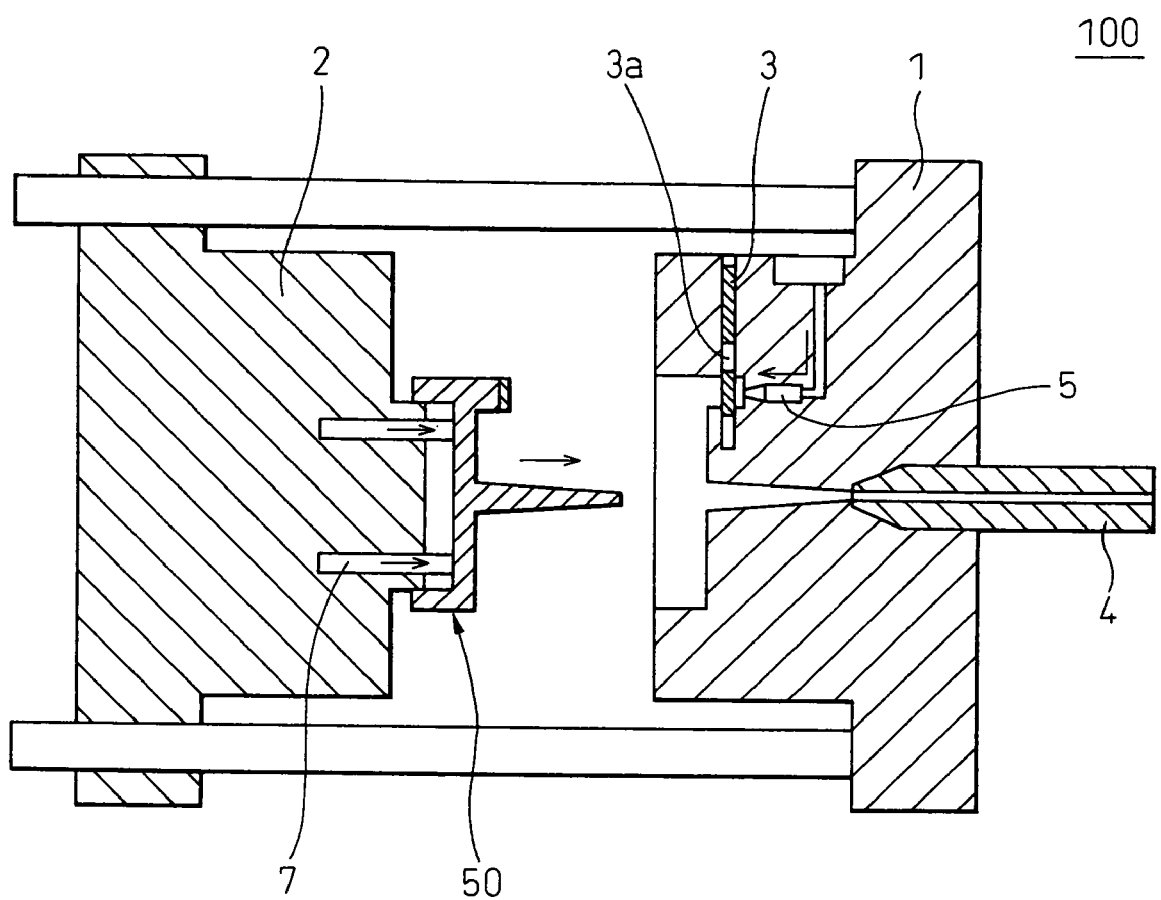
FIG. 3 is a view showing the state of the mold apparatus in a shaped article takeout step and a first resin injection step of the first embodiment of the present invention.

On the other hand, at the time t4 where some time has passed since the time t3 where the cavity partitioning member 3 finishes moving upward, the leftward movement of the movable side mold 2 is finished and the movable side mold 2 is completely open in state (see FIG. 3). When the movable side mold 2 is in an open state, the ejector pins 7 begin protruding toward the two-color shaped article 50 formed in the previous shaping cycle and stuck to the movable side mold 2. At the time t8, the protruding lengths of the ejector pins 7 becomes the maximum and the two-color shaped article 50 detaches from the movable side mold 2. The period from the time t1 to the time t8 becomes the shaped article takeout steps A and B. Further, the protrusion from the ejector pins 7 may begin before the movable side mold 2 finishes opening. At the time t8 where the two-color shaped article 50 is detached, the movable side mold 2 begins moving rightward and begins to close the mold. In parallel with this, the ejector-pins 7 begin retracting towards their original positions.

Figure 5:
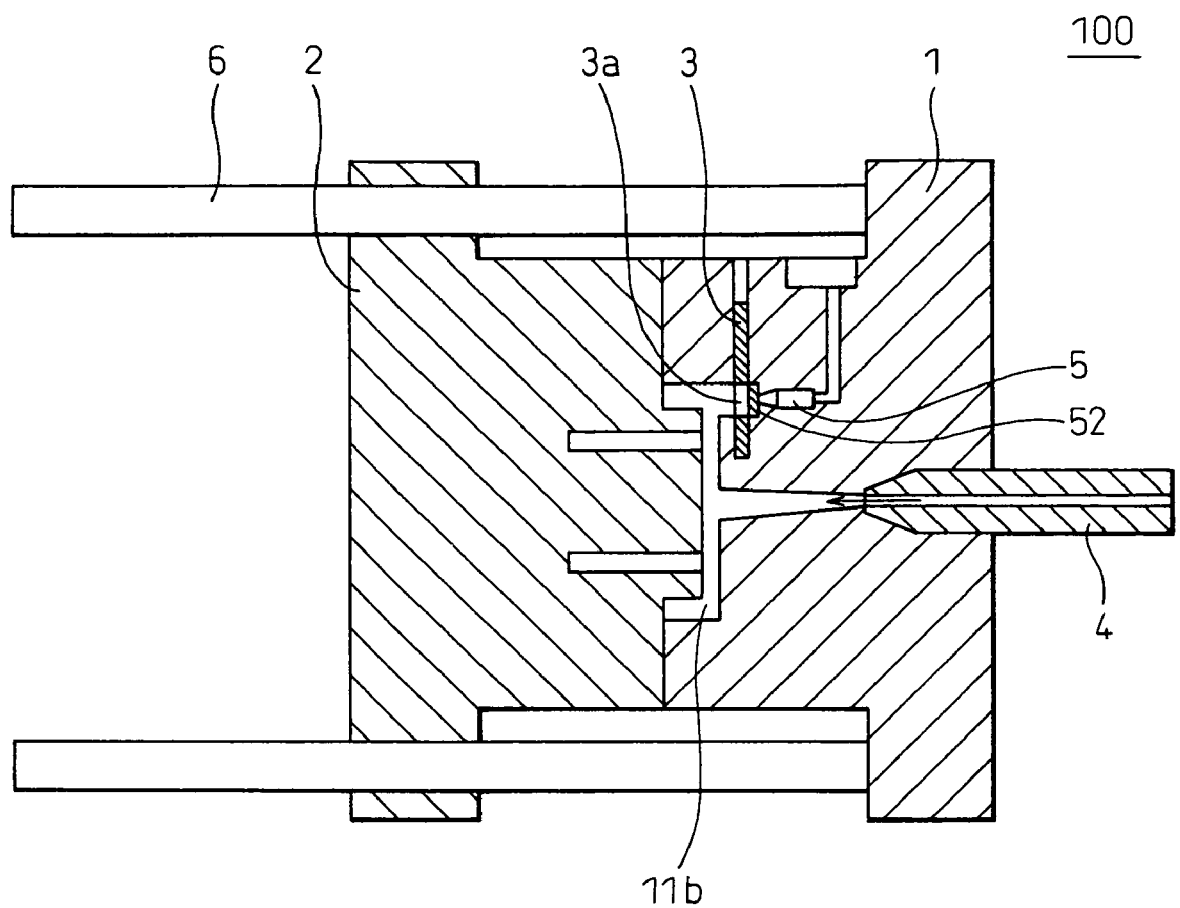
FIG. 5 is a view showing the state of the mold apparatus in a second resin injection step of the first embodiment of the present invention.

At the time t9, the movable side mold 2 is closed and clamped to the fixed side mold 1 (see FIG. 5). The period from the time t8 to the time t9 becomes the mold closing step C.

At the time t9, when the mold is closed, the molten polypropylene resin is injected from the injection nozzle 4 of the injection molding machine (not shown). The first elastomer filled in the first space 11a melt bonds with the molten polypropylene at the end face 52a (see FIG. 7(c)). At the time t10, the polypropylene finishes being injected. The period from the time t9 to the time t10 becomes the second resin injection step D. In the period from the time t10 to the time t11, the molten polypropylene resin is cooled and solidified by the mold. The period from the time t10 to the time t11 becomes the second resin solidification step E. By doing this, the two-color shaped article 50 integrally molded from the first resin (first elastomer) and the second resin (polypropylene) is molded. At the time t11, when the polypropylene finishes being solidified, one cycle of molding is completed. The next molding cycle begins again at the time t1. By doing this, the steps from the time t1 to the time t11 are repeated, whereby the shaped article 50 is manufactured in large quantities.

In the first embodiment, the shaped article takeout steps (A and B), mold closing step C, closed first space forming step F, first resin injection step G, first resin solidification step H, and first and second space communication step I proceed in parallel; the closed first space forming step F begins after the time t1 where the shaped article takeout step is started; and the mold closing step C is finished after the time t7 where the first and second space communication step is finished.

That is, by performing the elastomer molding process using the time Z from the time t2 to the time t7 in the range of the time period Y needed for the shaped article takeout step and mold closing step from the time t1 to the time t9, the time of the shaped article takeout step and mold closing step which was not actively used at all in the past can be used effectively for the molding process. By this, the molding time X of 1 cycle can be reduced.

In the above description, the molding of only one first resin (elastomer) coupled with the molding of the second resin (polypropylene) was described. That is, only the (b) molding of the first elastomer was described in FIG. 1. However, as shown in FIG. 1(c), multi-color molding performing molding of the second elastomer in parallel with molding of the first elastomer is of course possible. Further, multi-color molding performing molding of a plurality of elastomers such as molding of a third elastomer, molding of a fourth elastomer, . . . is of course possible.

Second Embodiment

Figure 8:
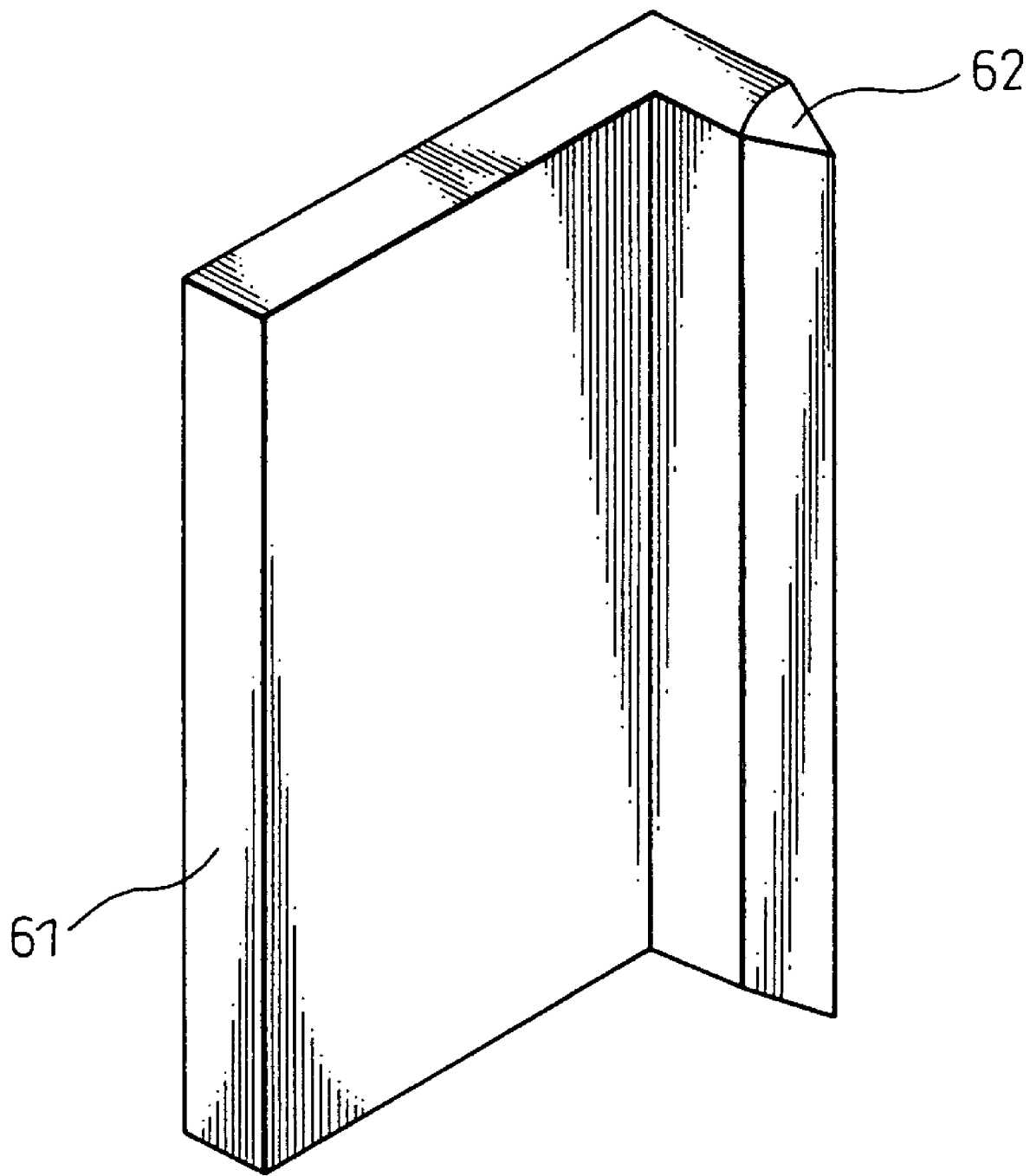
FIG. 8 is a view showing a two-color shaped article molded by a second embodiment of the present invention.

Next, a second embodiment of the present invention will be explained with reference to FIG. 8 and FIG. 9. The second embodiment is a two-color molding method replacing the cavity partitioning member 3 of the first embodiment with a movable first space member 22. FIG. 8 is a view showing a two-color shaped article 60 molded in the second embodiment, for example, a door of a car air-conditioner. The two-color shaped article 60 is comprised of the main part 61 and the packing part 62. The main part 61 has an L-shape of a combination of two plates. At the end part of the L-shape, the packing part 62 is integrally molded. The packing part 62 is a columnar member with a fan-shaped cross-section. The main part 61 is made from a hard resin (second resin), for example, a general-use resin polypropylene, while the packing part 62 is made from a soft resin (first resin), for example, an elastomer.

The movement of the first space member will be explained with reference to FIG. 9. FIG. 9 gives views showing the internal structure of the mold. FIG. 9(a) is a view showing the relationship among the first space member 22, compact injection molding unit 5, and mold cavity (second space) 21 in the closed state. FIG. 9(b) is a view showing the relationship among the first space member 22, compact injection molding unit 5, and mold cavity (second space) 21 in the state communicated with the second space 21. The first space member 22, in FIG. 9, is shown with its bottom part omitted and only the top part shown. The cylindrically shaped first space member 22 has a columnar part 22a having part of its circular cross-section, that is, a fan-shaped part 22b, as a cross-section, cut away. Further, the cutaway fan-shaped columnar part forms the first space 22a.

The first space 22a is filled, in the state of FIG. 9(a), with the elastomer injected from the compact injection molding unit 5 (first resin injection step). Further, the injected and filled elastomer is cooled and solidified (first resin solidification step). When the elastomer solidifies, the first space member 22 rotates (displaces) in the arrow direction of FIG. 9(b). When stopping rotating, in the state of FIG. 9(b), the first space 22a filled with the elastomer is communicated with the second space 21 through its side surface 22c (first and second space communication step). Next, the second space 21 is filled by injection with molten polypropylene (second resin injection step). The elastomer filled in the first space 22a melt bonds with the molten polypropylene at the side surface 22c. Further, the polypropylene is cooled and solidified (second resin solidification step). In this way, the first resin (elastomer) and the second resin (polypropylene) are integrally molded whereby a two-color shaped article 60 is molded.

When the two-color shaped article 60 is molded, the mold starts to open. The elastomer positioned in the first space 22a becomes integral with the polypropylene positioned at the second space 21, sticks to the movable side mold, and detaches from the first space 22a positioned in the fixed side mold (shaped article takeout step). When the first space 22a becomes empty, the first space member 22 rotates in the opposite direction to the arrow direction of the FIG. 9(b) and returns to the original position shown in FIG. 9(a), whereby the first space 22a is cut off from the second space 21. In this way, a first space 22a closed for being filled with the elastomer by injection is formed (closed first space forming step). Next, the mold is closed (mold closing step).

The time charts explained in the first embodiment (FIG. 1) can also be used as they are in the second embodiment. For this reason, the explanation of the second embodiment using the time charts will be omitted.

Third Embodiment

Figure 10:
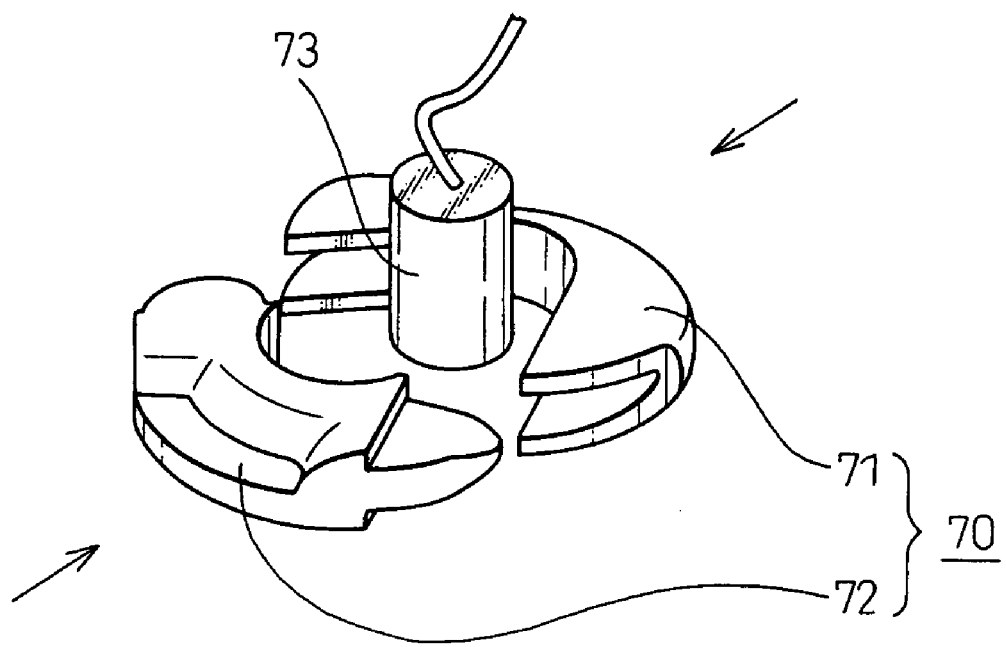
FIG. 10 is a view showing a state of use of a two-color shaped article molded by a third embodiment of the present invention.

Next, a third embodiment of the present invention will be explained with reference to FIG. 10 to FIG. 13. The third embodiment is a two-color molding method using a modification of the movable first space member 22 of the second embodiment. FIG. 10 is a view showing of a thermistor fixing coupling and thermistor (thermometer) 73 of a two-color shaped article 70, for example, car air-conditioner, molded in the third embodiment. The coupling 70 is comprised of a first coupling 71 and a second coupling 72. The coupling 70 grips the thermistor 73 by the two parts 71 and 72 to thereby seal the two by the packing parts.

Figure 11:
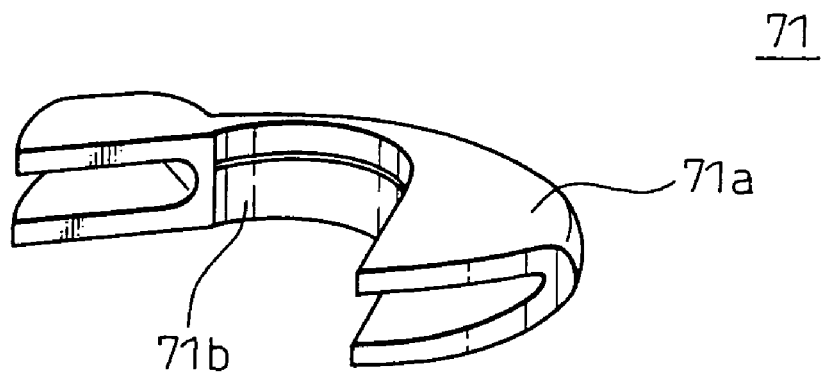
FIG. 11 is a view showing a two-color shaped article molded by a third embodiment of the present invention.

FIG. 11 is a perspective view showing details of the first coupling 71. The first coupling 71 is comprised of a main part 71a and packing part 71b. The second coupling 72 is configured similar to the first coupling 71. Further, the main part 71a is made from a hard resin (second resin), for example, a general-use resin polypropylene, while the packing part 71b is made from a soft resin (first resin), for example, an elastomer.

Figure 12:
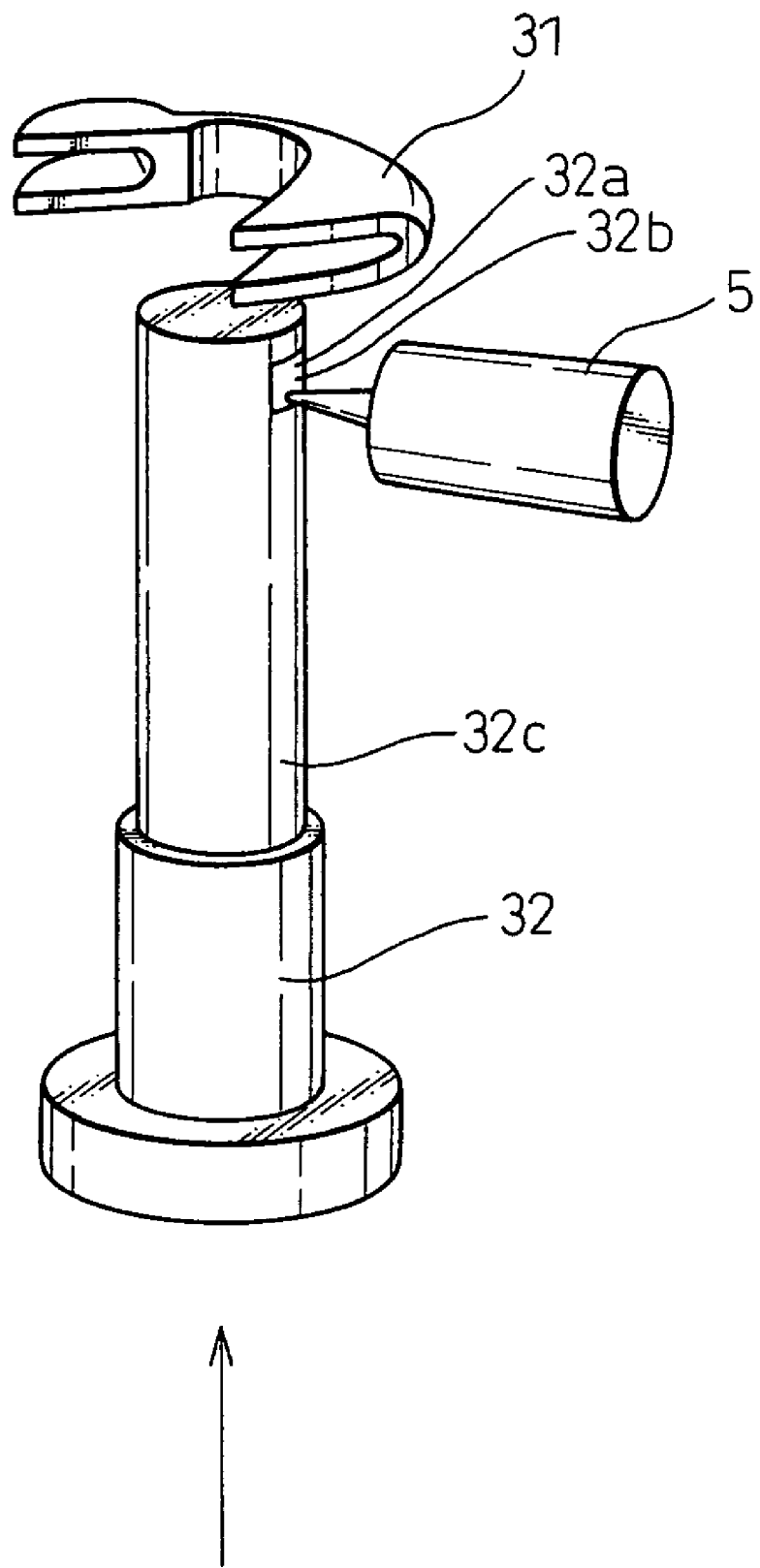
FIG. 12 is a view showing movement of a first space member of the third embodiment of the present invention.
Figure 13:
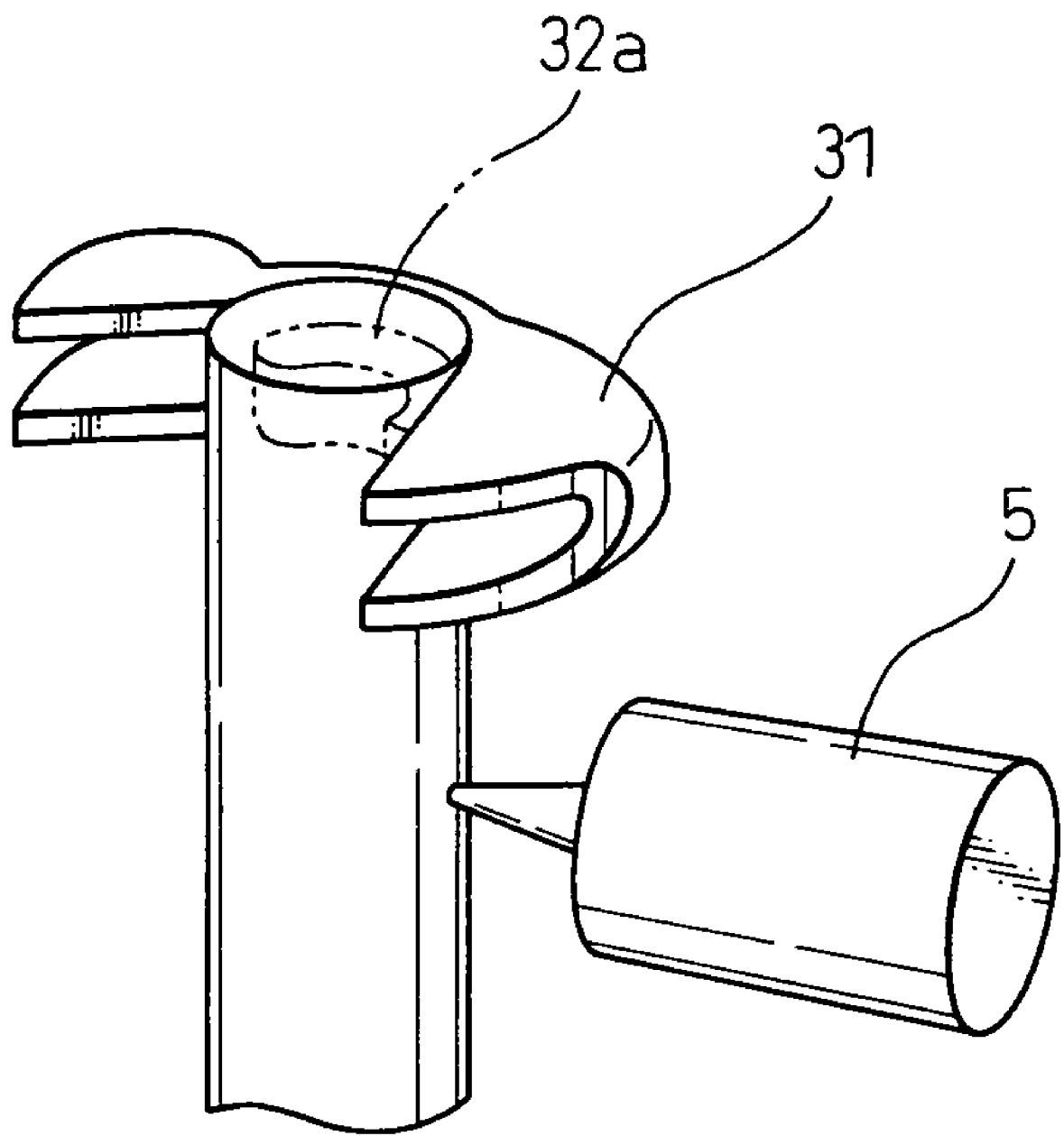
FIG. 13 is a view showing movement of a first space member of the third embodiment of the present invention.

The movement of the first space member will be explained with reference to FIG. 12 and FIG. 13. FIG. 12 and FIG. 13 are views showing the internal structure of the mold. FIG. 12 is a view showing the relationship among the first space member 32, compact injection molding unit 5, and mold cavity (second space) 31 in the closed state. FIG. 13 is a view showing the relationship among the first space member 32, compact injection molding unit 5, and mold cavity (second space) 31 in the state where the first space 32a is communicated with the second space 31. The cylindrically shaped first space member 32 has part of the side surface of the cylinder cut away to form a semidonut shaped member. Further, the cutaway part of the semidonut shaped member forms the first space 32a.

The first space 32a is filled, in the state of FIG. 12, with an elastomer injected from the compact injection molding unit 5 (first resin injection step). Further, the injected and filled elastomer is cooled and solidified (first resin solidification step). Next, the first space member 22 rises (displaces) in the arrow direction of FIG. 12. After finishing rising, the state of FIG. 13 is reached. In this state, the first space 32a filled with the elastomer communicates with the second space 31 through the side surface 32b (first and second space communication step). Next, the second space 31 is filled with molten polypropylene by injection (second resin injection step). The elastomer filled in the first space 32a melt bonds with the molten polypropylene at the side surface 32b. Further, the polypropylene is cooled and solidified (second resin solidification step). In this way, the first resin (elastomer) and the second resin (polypropylene) are integrally molded to form a two-color shaped article 70.

When the two-color shaped article 70 is molded, the mold starts to open. The elastomer positioned in the first space 32a becomes integral with the polypropylene positioned at the second space 31, sticks to the movable side mold, and detaches from the first space 32a positioned in the fixed side mold (shaped article takeout step). When the first space 32a becomes empty, the first space member 32 displaces in the opposite direction to the arrow direction of FIG. 12 and returns to the original position shown in FIG. 12, whereby the first space 32a is cut off from the second space 31. In this way, a first space 32a closed for being filled with the elastomer by injection is formed (closed first space forming step). Next, the mold is closed (mold closing step).

The time charts explained in the first embodiment (FIG. 1) can also be used as they are in the third embodiment. For this reason, the explanation of the third embodiment using the time charts will be omitted.

By performing the elastomer molding step using the time Z from the time t2 to the time t7 in the range of the time period Y needed for the shaped article takeout step (A and B) and mold closing step C from the time t1 to the time t9, the time of the shaped article takeout step (A and B) and mold closing step C which was not actively used at all in the past can be used effectively for the molding process. By this, the molding time X of 1 cycle can be reduced.

In this way, it becomes possible to provide a two-color molding method with such a short cycle time and a multicolor molding method including the two-color molding method.

While the present invention has been described with reference to specific embodiments chosen for purpose of illustration, it should be apparent that numerous modifications could be made thereto by those skilled in the art without departing from the basic concept and scope of the present invention.

The invention claimed is:

1. A two-color molding method for integrally molding two types of thermoplastic resins, said two-color molding method using
a mold apparatus having a fixed side mold, a movable side mold freely openable and closable with respect to said fixed side mold, and a movable partitioning member which is arranged at least at one of said fixed side mold and said movable side mold and partitions into a first space for molding a first thermoplastic resin and a second space for molding a second thermoplastic resin, the movable partitioning member defining a hole, the method comprising:
opening said movable side mold from said fixed side mold,
taking out a two-color shaped article having a first color portion and a second color portion from said mold,
closing said movable side mold with said fixed side mold,
injecting a molten second thermoplastic resin to said second space to form said second color portion of said two-color shaped article,
solidifying said molten second thermoplastic resin in said second space,
displacing said movable partitioning member in a first direction in the state with said movable side mold opened from said fixed side mold to change from a state where said first space communicates with said second space through said hole in said movable partitioning member to a state where said first space is cut off from said second space to form a closed first space,
injecting a molten first thermoplastic resin into said first space to form said first color portion of said two-color shaped article,
solidifying said first color portion of said two-color shaped article in said first space, and
displacing said movable partitioning member in a second direction opposite to said first direction to make said first space in which said first color portion of said two-color shaped article is disposed communicate with said second space through said hole in said movable partitioning member, wherein
said opening step, said taking step and said closing step are performed sequentially in this order over a defined time period, and said displacing said movable member in said first direction step, said injecting said molten first thermoplastic resin step, said solidifying said molten first thermoplastic resin step and said displacing said movable partitioning member in said second direction are done sequentially in this order in said defined time period,
said displacing said movable partitioning member in said first direction step is started after said opening step is started,
said closing step ends after said displacing said movable partitioning member in said second direction step is ended,
said injecting of said molten second thermoplastic resin injects said molten second thermoplastic resin through said hole in said movable partitioning member to directly engage said first color portion of said two-color shaped article,
all steps from said opening step to said displacing said movable partitioning member in said second direction step are repeated to produce a plurality of said two-color shaped articles, and
a size and a shape of said hole in said movable partitioning member is equal to a size and a shape, respectively, of said second space of said mold cavity immediately adjacent said movable partitioning member.

2. A two-color molding method according to claim 1, wherein said movable partitioning member is provided with the first space.

3. A two-color molding method according to claim 1 or 2, wherein
said first thermoplastic resin is a soft resin, said second thermoplastic resin is a hard resin,
said two-color shaped article is formed from a main part and a packing part, said main part is formed from said second thermoplastic resin, said packing part is formed from said first thermoplastic resin.

4. A multicolor molding method including the two-color molding method according to claim 1.

5. A two-color molding method for integrally molding two types of thermoplastic resins, said two-color molding method using
a mold apparatus having a fixed side mold, a movable side mold freely movable with respect to said fixed side mold between a closed position where a mold cavity is formed and an open position where said mold cavity is open, and a movable partitioning member which is arranged at least at one of said fixed side mold and said movable side mold and partitions said mold cavity into a first space for molding a first thermoplastic resin and a second space for molding a second thermoplastic resin, the movable partitioning member defining a hole, the method comprising:
moving said mold apparatus to said open position by moving said movable side mold from said fixed side mold,
taking out a two-color shaped article from said mold while said mold apparatus is in said open position,
displacing said movable partitioning member in a first direction while said movable mold is moving from said fixed side mold to change from a state where said first space communicates with said second space through said hole in said movable partitioning member to a state where said first space is cut off from said second space to form a closed first space,
injecting a molten first thermoplastic resin into said first space to form a first portion of said two-color shaped article while said movable mold is moving from said fixed side mold,
solidifying said first portion of said two-color shaped article in said first space while said mold apparatus is in said open position,
displacing said movable partitioning member in a second direction opposite to said first direction to make said first space in which said first portion of said two-color shaped article is located communicate with said second space through said hole in said movable partitioning member after said solidifying step and while said mold apparatus is in said open position,
moving said mold apparatus to said closed position by moving said movable side mold toward said fixed side mold,
injecting a molten second thermoplastic resin to said second space to form a second portion of said two-color shaped article, said second portion of said two-color shaped article extending through said hole in said movable partitioning member to engage said first portion of said two-color shaped article, and
solidifying said molten second thermoplastic resin in said second space, wherein all steps are repeated to produce a plurality of said two-color shaped articles, and a size and a shape of said hole in said movable partitioning member is equal to a size and a shape, respectively, of said second space of said mold cavity immediately adjacent said movable partitioning member.

* * * * *